US008433770B2

(12) United States Patent
Noya et al.

(10) Patent No.: US 8,433,770 B2
(45) Date of Patent: Apr. 30, 2013

(54) COMBINED LOCAL AND NETWORK STORAGE INTERFACE

(75) Inventors: Eric S. Noya, Groton, MA (US); Chris R. Franklin, Merrimack, NH (US); Randy M. Arnott, Mont Vernon, NH (US); Jeffrey T. Wong, Newton, MA (US)

(73) Assignee: Broadcom Corporation, Irvine, CA (US)

( * ) Notice: Subject to any disclaimer, the term of this patent is extended or adjusted under 35 U.S.C. 154(b) by 1670 days.

(21) Appl. No.: 11/260,278

(22) Filed: Oct. 28, 2005

(65) Prior Publication Data

US 2007/0028138 A1 Feb. 1, 2007

Related U.S. Application Data

(60) Provisional application No. 60/703,500, filed on Jul. 29, 2005.

(51) Int. Cl.
*G06F 15/167* (2006.01)
*G06F 15/16* (2006.01)
*G06F 13/28* (2006.01)

(52) U.S. Cl.
USPC ........... 709/212; 709/213; 709/216; 709/217; 710/22

(58) Field of Classification Search .................. 709/212
See application file for complete search history.

(56) References Cited

U.S. PATENT DOCUMENTS

| 5,768,623 | A | * | 6/1998 | Judd et al. ................. 710/37 |
| 6,029,231 | A | | 2/2000 | Blumenau |
| 6,098,114 | A | * | 8/2000 | McDonald et al. ............... 710/5 |
| 6,115,747 | A | | 9/2000 | Billings et al. |
| 6,397,229 | B1 | * | 5/2002 | Menon et al. ................. 707/204 |

(Continued)

OTHER PUBLICATIONS

Wright, Charles P. et al., "Versatility and Unix Semantics in a Fan-Out Unification File System", Nov. 9, 2004, Stony Brook U. CS TechReport FSL-04-01b, pp. 1-20.
D. Patterson, G. Gibson, and R. Katz. "A Case for Redundant Array of Inexpensive Disks (RAID)", *Proceedings of ACM SIGMOD '88*, pp. 109-116, Jun. 1988.
Non-Final Rejection mailed Nov. 15, 2007 for U.S. Appl. No. 11/260,250, filed Oct. 28, 2005, 16 pgs.

(Continued)

*Primary Examiner* — Kenny Lin
*Assistant Examiner* — Shaq Taha
(74) *Attorney, Agent, or Firm* — Sterne, Kessler, Goldstein & Fox PLLC

(57) ABSTRACT

A method, system and computer program product for a generic data storage interface for local and remote networked storage is provided. It comprises providing a data storage interface accessible by an operating system, transmitting data from an application running on the operating system to the data storage interface and selectively storing the data using the same data storage interface in either a local or a remote networked storage location.
Firmware for the common data storage interface assigns a unique identifier that classifies an I/O request as a local or remote networked I/O request and adds the I/O request to a common stack for local and remote networked data storage elements. When an I/O request is removed from the stack, the unique identifier is used to identify the I/O request as a local or remote networked I/O request. Local I/O requests are executed via a local bus such as PCI, or SCSI. Remote networked I/O requests require a connection to one or more remote networked storage elements via a network. Memory space in a cache may be allocated for both local or remote networked I/O requests. DMA transfer may be employed for both local and remote networked I/O requests. Both local and remote networked I/O requests are executed using the same firmware and the same data interface.

20 Claims, 8 Drawing Sheets

U.S. PATENT DOCUMENTS

| | | | |
|---|---|---|---|
| 6,567,919 B1 | 5/2003 | Yanagihara et al. | |
| 6,944,789 B2 | 9/2005 | Kodama | |
| 7,493,424 B1* | 2/2009 | Bali et al. | 710/22 |
| 2001/0052061 A1* | 12/2001 | Fradette | 711/202 |
| 2003/0229819 A1* | 12/2003 | Kodama | 714/5 |
| 2004/0015762 A1 | 1/2004 | Klotz et al. | |
| 2004/0054838 A1* | 3/2004 | Hoese et al. | 710/305 |
| 2004/0078542 A1* | 4/2004 | Fuller et al. | 711/172 |
| 2004/0128363 A1* | 7/2004 | Yamagami et al. | 709/217 |
| 2004/0148542 A1 | 7/2004 | McAfee et al. | |
| 2005/0108582 A1 | 5/2005 | Fung | |
| 2005/0114595 A1 | 5/2005 | Karr et al. | |
| 2005/0210098 A1 | 9/2005 | Nakamichi et al. | |
| 2005/0283655 A1 | 12/2005 | Ashmore | |
| 2006/0005097 A1 | 1/2006 | Ichikawa et al. | |
| 2006/0194386 A1 | 8/2006 | Yao et al. | |
| 2007/0038749 A1 | 2/2007 | Noya et al. | |

OTHER PUBLICATIONS

Final Rejection mailed Jul. 3, 2008 for U.S. Appl. No. 11/260,250, filed Oct. 28, 2005, 19 pgs.
Second Non-Final Rejection mailed Mar. 19, 2009 for U.S. Appl. No. 11/260,250, filed Oct. 28, 2005, 14 pgs.
Final Rejection mailed Sep. 11, 2009, for U.S. Appl. No. 11/260,250, filed Oct. 28, 2005, 14 pages.
Non-Final Rejection mailed Aug. 18, 2010, for U.S. Appl. No. 11/260,250, filed Oct. 28, 2005, 12 pages.
Non-Final Rejection mailed Jun. 9, 2011, for U.S. Appl. No. 11/260,250, filed Oct. 28, 2005, 13 pages.
Final Rejection mailed Mar. 26, 2012, for U.S. Appl. No. 11/260,250, filed Oct. 28, 2005, 17 pages.
Non-Final Rejection mailed Jan. 24, 2013, for U.S. Appl. No. 11/260,250, filed Oct. 28, 2005, 17 pages.

* cited by examiner

COMBINED LOCAL AND NETWORK STORAGE INTERFACE

CROSS-REFERENCE TO RELATED APPLICATIONS

This application claims priority to U.S. Provisional Application. No. 60/703,500 filed Jul. 29, 2005, entitled "A COMBINED LOCAL AND NETWORK STORAGE INTERFACE," and which is incorporated by reference herein in its entirety.

This application is related to U.S. application Ser. No. 11/260,250 entitled "A COMBINED LOCAL AND NETWORK STORAGE INTERFACE" filed concurrently herewith and incorporated by reference herein in its entirety.

BACKGROUND OF INVENTION

1. Field of the Invention

The disclosed invention generally relates to data storage and more specifically to an interface for local and network data storage.

2. Background Art

In the field of information technology, the terms "storage" or "memory" refer to media that retain data for some interval of time, possibly even after electrical power to the computer is turned off. In a business or personal computer system, storage often takes the form of either a hard disk, random access memory (RAM) or cache memory. A hard disk stores the user's files and programs even if the computer is turned off, and has a large capacity. RAM is used to store information such as programs and data temporarily while the computer is using them. RAM can be accessed at very high speeds, which makes it suitable for applications, however RAM used for these purposes is typically volatile and all information in it is lost when the computer is turned off. Cache memory, is often built into the microprocessor, hard drives, or other devices, providing high speed dedicated memory to minimize repeated access to slower storage devices.

There are many applications, particularly in a business environment, where there are needs beyond what can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware or software failures to any extent possible. Some people working with multimedia files need fast data transfer exceeding the speeds current drives can deliver, without spending a fortune on specialty drives. These situations require that the traditional "one hard disk per system" model be set aside and a new system employed. One popular technique is known as Redundant Arrays of Inexpensive (or Independent) Disks, or RAID. See D. Patterson, G. Gibson, and R. Katz. "A Case for Redundant Array of Inexpensive Disks (RAID)", Proceedings of ACM SIGMOD '88, pages 109-116, June 1988.

Data can also be stored in storage systems over a network. This option may be attractive due to spatial and/or financial constraints involved with implementing a dedicated storage system for each individual in a group or to facilitate sharing of data among members of a group. Sharing storage usually simplifies storage administration and adds flexibility since cables and storage devices do not have to be physically moved to move storage from one server to another.

Currently computer system I/O boards have any of a local storage controller interface (such as Advanced Technology Attachment (ATA), Integrated Drive Electronics (IDE), Serial ATA (SATA), Small Computer System Interface (SCSI), RAID, Serial Attached SCSI (SAS) or Enhanced IDE (EIDE) etc.) to access local storage or a network interface, such as 10/100 Mbps network cards or gigabit Ethernet network cards, to access network storage via network storage protocols such as internet Small Computer System Interface (iSCSI) or Fibre Channel (FC). As distinct interfaces, the hardware cards and software interfaces are managed separately by the operating system (OS) and the user interacts with each associated storage system individually. However, distinct local and remote networked storage units do not provide the same functionality or capabilities that can be delivered by a single local storage unit. The inventors have found that there is a need for improved data storage interfaces.

BRIEF SUMMARY OF THE INVENTION

A common data storage interface for local and remote networked storage is implemented via a method, system and computer program product. The data storage interface is accessible by an operating system and data is transmitted from an application running under the operating system to the data storage interface and selectively stored using a single data storage interface to access both local and remote networked storage locations.

Firmware for the common data storage interface assigns a unique identifier that classifies an I/O request as a local or remote networked I/O request and adds the I/O request to a common stack for local and remote networked data storage elements. When an I/O request is removed from the stack, the unique identifier is used to identify the I/O request as a local or remote networked I/O request. Local I/O requests are executed via a local bus such as PCI, or SCSI. Remote networked I/O requests require a connection to one or more remote networked storage elements via a network. Memory space in a cache may be allocated for both local or remote networked I/O requests. DMA transfer may be employed for both local and remote networked I/O requests. Both local and remote networked I/O requests are executed using the same firmware and the same data interface.

Additional features and advantages of the invention will be set forth in the description which follows, and in part will be apparent from the description, or may be learned by practice of the invention.

It is to be understood that both the foregoing summary and the following detailed description are exemplary and explanatory and are intended to provide further explanation of the invention as claimed. The summary and detailed description are not intended to limit the scope of the claimed invention in any way.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
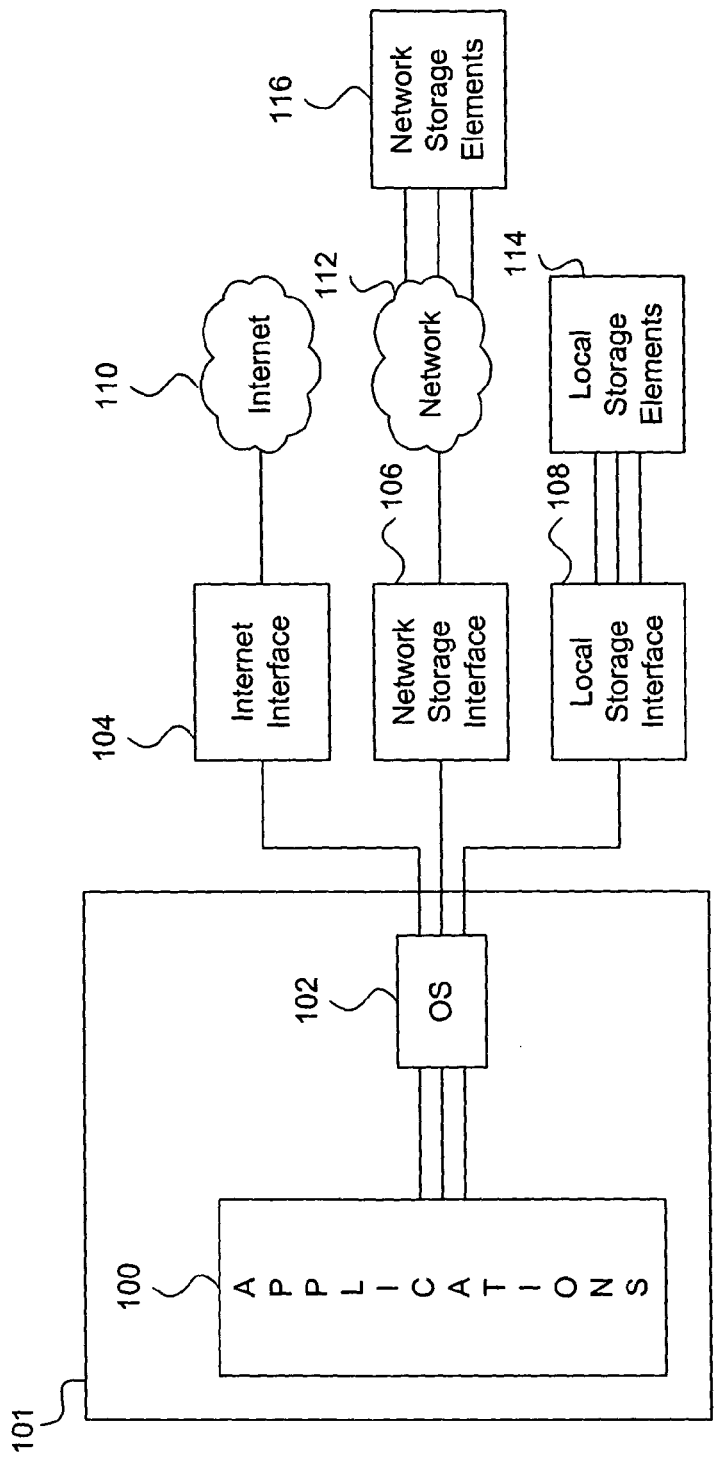
FIG. 1 illustrates an example storage system.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The present invention will be described in terms of several embodiments applicable to a generic interface for local and network storage. It will be understood that the essential generic interface concepts disclosed herein are applicable to a wide range of designs and can be applied to applications having varied purposes. Thus, although the invention will be disclosed and described using a generic interface application as an example, the scope of the invention is not in any way limited to this field.

Terminology

Input/Output (I/O)

I/O generally refers to transferring data or control signals between the CPU and a peripheral device. Every transfer is an output from one device and an input into another. I/O may be considered as a collection of interfaces that different functional units of an information processing system use to communicate with each other, or to transfer data. Inputs are the signals received by the unit, and outputs are the signals sent from it.

The CPU and main memory, i.e., memory that the CPU can read and write to directly with individual instructions, and any movement of information between the CPU and main memory, for example to or from a disk drive, is also considered I/O.

Any request for data transfer, between storage devices is also referred to as an I/O request. An I/O request from an application to store or retrieve data from a local or remote networked storage element may be in the form of a command packet incorporating variables necessary for data transfer.

Local Storage

"Local storage" elements refers to storage elements that are "local" to the user in the sense that a network connection such as a modem, network interface card, or other remote communication link is not required to access these storage elements. An I/O request that requires data to be transferred to or from a local storage element is referred to as a "local I/O request". Common local storage elements include but are not limited to local IDE and SCSI drives. Another common method for local storage is the use of IDE or SCSI drives in a RAID configuration. The fundamental structure of RAID is the array. A RAID array is a collection of drives that is configured, formatted and managed in a particular way. The number of drives in the array, and the way that data is split between them, is what determines the RAID level, the capacity of the array, and its overall performance and data protection characteristics. A number of RAID levels are known. These include, JBOD which stands for Just a Bunch of Drives. RAID0, or striping, provides the highest performance but no data redundancy. Data in the array is striped (i.e. distributed) across several physical drives. RAID1, or mirroring, mirrors the data stored in one physical drive to another. RAID1$n$, or n-way mirroring, mirrors the data stored in one hard drive to several hard drives. RAID10 is also known as RAID(0+1) or striped mirror sets. This array type combines mirrors and stripe sets. RAID10$n$ stripes multiple n-way mirror sets. RAID5, also known as a stripe with parity, stripes data as well as parity across all drives in the array. RAID50 is also known as striped RAID5 sets. Parity information is interspersed across each RAID5 set in the array.

Network Storage

"Network storage", "remote storage" or "remote networked storage" elements refers to data storage elements that are accessed via a remote communication link such as a local, wide area or public area network link. An I/O request that requires data to be transferred to or from a network storage element via a network is referred to as a "remote networked I/O request". Network storage elements store data remote to the user and provide access via a network access protocol. Network storage elements may include but are not limited to IDE or SCSI drives or a combination of IDE and SCSI drives in a RAID configuration that has to be accessed over a network. Different protocols are used to access different types of network storage. These protocols include but are not limited to any combination of iSCSI, Server Message Block (SMB), Network File System (NFS), Common Internet File System (CIFS), Inter-network Packet Exchange (IPX) and Sequenced Packet Exchange (SPX). Network storage types include but are not limited to Storage Area Networks (SANs), Network-attached Storage (NAS), Internet SCSI (iSCSI) and ATA-over-Ethernet (AOE).

SANs are normally built on an infrastructure specially designed to handle storage communications. SANs provide faster and more reliable access than higher level protocols such as NAS. The most common SAN technology is Fibre Channel networking with the SCSI command set. A typical Fibre Channel SAN is made up of a number of fibre channel switches which are connected together to form a fabric or network. An alternative, and more recent, SAN protocol is iSCSI which uses the same SCSI command set over Transmission Control Protocol (TCP)/Internet Protocol (IP) and typically, Ethernet. Connected to the SAN will be one or more servers and one or more disk arrays, tape libraries, or other storage devices. In the case of a Fibre Channel SAN, the servers would use special Fibre Channel host bus adapters (HBAs) and optical fiber. The AOE protocol embeds the ATA (or IDE) protocol inside of raw Ethernet frames. While a raw Ethernet protocol like AOE cannot be routed over a network like iSCSI, it does provide a simple discovery model with fairly low overhead. iSCSI SANs typically use Ethernet network interface cards, or special TCP Offload Engine (TOE) cards.

Network-attached storage (NAS) systems are generally computing-storage devices that can be accessed over a computer network, rather than directly being connected to the computer (via a computer bus). This enables multiple users to share the same storage space at once, and often minimizes overhead by centrally managing hard disks. Network storage systems usually contain one or more hard disks, often arranged into logical RAID arrays. NAS is an alternative to a specialized storage area network (SAN), where devices communicate using the block based SCSI protocol over dedicated Fibre Channel or IP networks. NAS devices are often connected to a shared general purpose local area network, reducing cost overhead, while also reducing access speed. The protocol used with NAS is a file based protocol such as Network File System (NFS) or Microsoft's® Common Internet File System (CIFS).

Operating System (OS)

When the OS or an application wants to access a hard disk drive, it typically employs hardware drivers and system BIOS (Basic Input Output System) services. The system BIOS provides basic input and output routines for communicating between the software and the peripherals such as the keyboard, monitor and disk drive.

At the simplest level, an operating system manages hardware and software resources, provides an Application Programming Interface (API) and other system services. In a desktop computer, the hardware and software resources may include but are not limited to a processor, memory, disk space, etc. On some cell phones, PDAs and other mobile computing devices that also run an OS, they include the keypad, the screen, the address book, the phone dialer, the battery and the network connection. The OS provides a stable and consistent way for applications to deal with the hardware without having to know all the details of the hardware by providing an API. APIs allow a software developer to write an application on one computer that is portable to another computer even with different hardware and software configurations on the two machines. Operating systems can be either real-time operating systems (RTOS) used to control machinery, scientific instruments and industrial systems; single-user, single task operating systems designed to manage the computer so that one user can effectively do one thing at a time; single-user, multi-tasking operating systems that most people use on their desktop and laptop computers and multi-user operating systems that allow many different users to take advantage of the computer's resources simultaneously.

Computer Software and Applications

Computer software (or simply software) refers to one or more computer programs stored in a storage element and executed to perform a desired function. Program software performs the function of the program it implements, either by directly providing instructions to the computer hardware or by serving as input to another piece of software.

Application software is a subclass of computer software that employs the capabilities of a computer directly to a task that a user wishes to perform. This is in contrast with system software which involves integrating a computer's various capabilities. Typical examples of application software include but are not limited to word processors, spreadsheets, video games, media players etc. Applications are typically separate from the operating system, though they are often tailored for specific platforms. User-written software tailors systems to meet the users specific needs. User software includes but is not limited to spreadsheet templates, word processor macros, scientific simulations, graphics and animation scripts.

Cache

A cache is used to speed up data transfer and may be either temporary or permanent memory. Memory and disk caches are common in computer systems and are used to speed up instruction execution, data update and retrieval. These temporary caches serve as staging areas, and their contents are constantly changing.

A "memory cache" or "CPU cache" is a memory bank that bridges main memory and the CPU. It is faster than main memory and allows instructions to be executed and data to be read and written at higher speeds.

Instructions and data are usually transferred from main memory to the cache in blocks. A level 1 (L1) cache is a memory bank built into the CPU chip. A level 2 (L2) cache is a secondary staging area that provides data to the L1 cache. L2 cache may be built into the CPU chip, reside on a separate chip in a multi-chip package module or be a separate bank of chips on the motherboard.

A disk cache is a section of main memory or memory on the disk controller board that bridges the disk drive and the CPU. When the disk is read, usually a larger block of data is copied into the cache than is immediately required. If subsequent reads find the data already stored in the cache, there is no need to retrieve it from the disk, which is slower to access. If the cache is used for writing, data are queued up at high speed and then written to disk during idle machine cycles by the caching program. Disk caches are usually just a part of main memory which is usually made up of common dynamic RAM (DRAM) chips, whereas memory caches usually use higher-speed static RAM (SRAM) chips.

For the purpose of this application, a cache can be located on either a local or remote networked storage element, on a controller card such as a RAID controller, the CPU or any other suitable media.

Direct Memory Access (DMA)

DMA allows certain hardware subsystems within a computer to access system memory for reading and/or writing independently of the CPU or a local processor. Many hardware systems use DMA including but not limited to disk drive controllers, RAID controller cards, graphics cards, network cards, and sound cards.

DMA allows devices of different speeds to communicate without subjecting the CPU to a massive interrupt load. Without a DMA controller, the CPU would have to copy each piece of data from the source to one of its registers, and then write it back again to the new location. During this time the CPU would be unavailable for other tasks.

A DMA transfer usually copies a block of memory from one device to another. While the CPU may initiate a data transfer, the transfer itself is performed by the DMA controller. A typical example is moving a block of memory from external memory such as a disk drive to faster internal memory or over a network to internal (on-chip) memory such as an L1 or L2 cache, a disk cache or memory on a RAID controller card. Such an operation does not stall the processor, which as a result can be scheduled to perform other tasks.

"Scatter-gather" DMA allows the transfer of data to multiple memory areas in a single DMA transaction. It is equivalent to the chaining together of multiple simple DMA requests. This method allows off-load of multiple I/O interrupts and data copy tasks from the CPU or local processor.

Remote Direct Memory Access (RDMA) is a concept whereby two or more computers communicate via DMA directly from the main memory of one system to the main memory of another. As there is no CPU, cache, or context switching overhead needed to perform the transfer, and transfers can continue in parallel with other system operations, this is particularly useful in applications where high throughput, low latency networking is needed such as in parallel clusters.

In RDMA over TCP/IP, the TCP/IP protocol is used to move the data over a commodity data networking technology such as Gigabit Ethernet. The RDMA implementation may have its TCP/IP stack implemented on a RAID controller card or a network adapter card, which would thus act as an I/O processor, taking up the load of RDMA processing.

Software-based RDMA emulation allows interoperation between systems with dedicated RDMA hardware and those without. One example of this might be the use of an interface with a hardware-equipped RDMA to serve a large number of clients with software-emulated RDMA implementations.

Example Storage System

FIG. 1 illustrates an example of a standard storage system comprising a computer system 101, user applications or software 100, operating system (OS) 102, internet interface 104, network storage interface 106, local storage interface 108, internet 110, network 112, local storage elements 114 and network storage elements 116.

Software applications 100 run under the OS 102 in computer system 101. OS 102 provides an API and a gateway to system resources by providing services to applications at various levels. There are a variety of operating systems available for computers, and these are selected depending on the type and power of the computer and the software to be executed. Examples of popular operating systems for personal computers include but are not limited to Microsoft® Windows, Apple Macintosh® OS, and Linux. The OS 102 acts through hardware connections and appropriate interfaces to access a network interface such as internet interface 104, which provides connectivity to a local or wide area network, such as the internet 110. OS 102 also acts through appropriate hardware and interfaces to access network storage interface 106, that provides access to network storage elements 116 via network 112. OS 102 is also operatively connected to access local storage interface 108 that provides access to local storage elements 114. The internet 110 is accessed independently of network 112 via internet interface 104.

When an application 100 needs to store data, it accesses a service provided by OS 102, and requests storage of the data either in local storage elements 114 or network storage elements 116 via the network 106 or local 108 storage interface, as appropriate.

Most computer systems have either a local storage interface 108 (such as SATA, IDE, RAID etc. and associated software) and/or a network storage interface 106 (such as iSCSI, 10/100 Mbps or gigabit Ethernet network cards and associated software) to access local or network storage elements 114, 116.

As distinct interfaces, these are managed separately by the OS 102 and applications 100. The inventors have found a novel way to present the user, applications 100 and OS 102 with a combined data storage interface.

Local storage 116 and network storage 114 shown in FIG. 1 provide separate stacks and separate interfaces to OS 102, and therefore appear (for example) to the OS 102 as different devices. In a Microsoft® Windows system, this separate interface structure is normally manifested in the representation of the local storage 116 and network storage 114 by different drive letters; for example, local storage 116 may be seen by the operating system as the "C" drive and network storage 114 may be seen as the "D" drive.

The storage configuration presented in FIG. 1 does not facilitate mirroring between RAID arrays on local storage elements 114 and RAID arrays/drives or files on network storage elements 116, nor can it readily boot from files stored on network storage elements 116.

Example Embodiments

In various embodiments of the invention, an improved apparatus and method for an interface to access local and network storage elements 114, 116 provides a single data storage interface that virtually combines multiple storage units, local and remote, into a single virtual storage unit. Instead of seeing several different disk drives on local and remotely networked systems and accessing them as separate devices, these storage units are presented to the OS 102 as a single storage unit. This structure makes multiple storage units, whether local or remote, invisible to the operating system storage service, so that they appear to be a single device to the applications and the end user. This single storage entity can perform any and all the functions of a local storage unit even though some of the storage locations may be accessed over a network. One way to create a virtual single storage entity is as part of a RAID array that includes local and network storage elements 114, 116. The user can view the multiple storage units, both local and remote, during configuration through software provided for that purpose.

In another aspect of the invention, network booting and low-level device mirroring to network servers is possible and can be done invisibly to the OS 102. A unified storage interface may be presented by using a single memory stack for accessing data on local and remote networked storage elements 114, 116. For example, a modified RAID stack may be employed. The stack determines if a memory access is to a local or remote networked storage device using a unique identifier associated with an I/O request. In this example, the RAID stack is aware of both local and remote storage topologies via the unique identifier and accesses the required storage location upon request from a host. Another aspect of the invention allows loading of software onto remote storage and executing the software from the remote location.

Software, firmware or drivers for a combined interface can run on a system processor, an auxiliary processor mounted on a motherboard or on a local processor mounted on a local/network storage interface card. The common interface is capable of using appropriate network protocol(s) to access storage devices over a network 112. it is the firmware that presents a single storage stack to OS 102 and applications 100 for accessing or storing data in local and remote networked storage elements 114,116. The firmware may run on the combined interface or independently on the system controller. In a software only embodiment, firmware running on a processor alone, without any specialized hardware, might be used to provide a virtual unified storage interface to the OS 102 and application 100.

Data transfer may be initiated by the combined interface while actual data transfer is performed using a DMA or RDMA controller. The DMA or RDMA controllers may be located on the hardware or software portion of the combined interface, on the local or remote networked storage device controllers or on other suitable media.

Memory or cache data space may or may not be allocated to buffer the data that is to be transferred to a local or remote networked storage location 114, 116.

A management application with a GUI may be used to configure the local and network storage elements 114, 116. On system startup, the combined interface firmware enumerates local and network storage elements (e.g. disk drives) 114, 116 and presents this information to the management application. The user can then selectively arrange the enumerated drives in a desired configuration. For example the user can virtually combine selected local and network drives, 114, 116 into a RAID array or configure network drives as a RAID array and manage local drives individually. In another example, the user may choose to increase available storage space by adding drives from remote network storage 116 through the management application. The management application also allows the user to set the system to boot-up from either a network or a local drive. The management application also allows for authentication procedures when accessing remote networked devices. The management application may also allow remote mirroring of data. A simpler management application runs at boot up and allows the user to configure local and network storage 114, 116.

Figure 2:
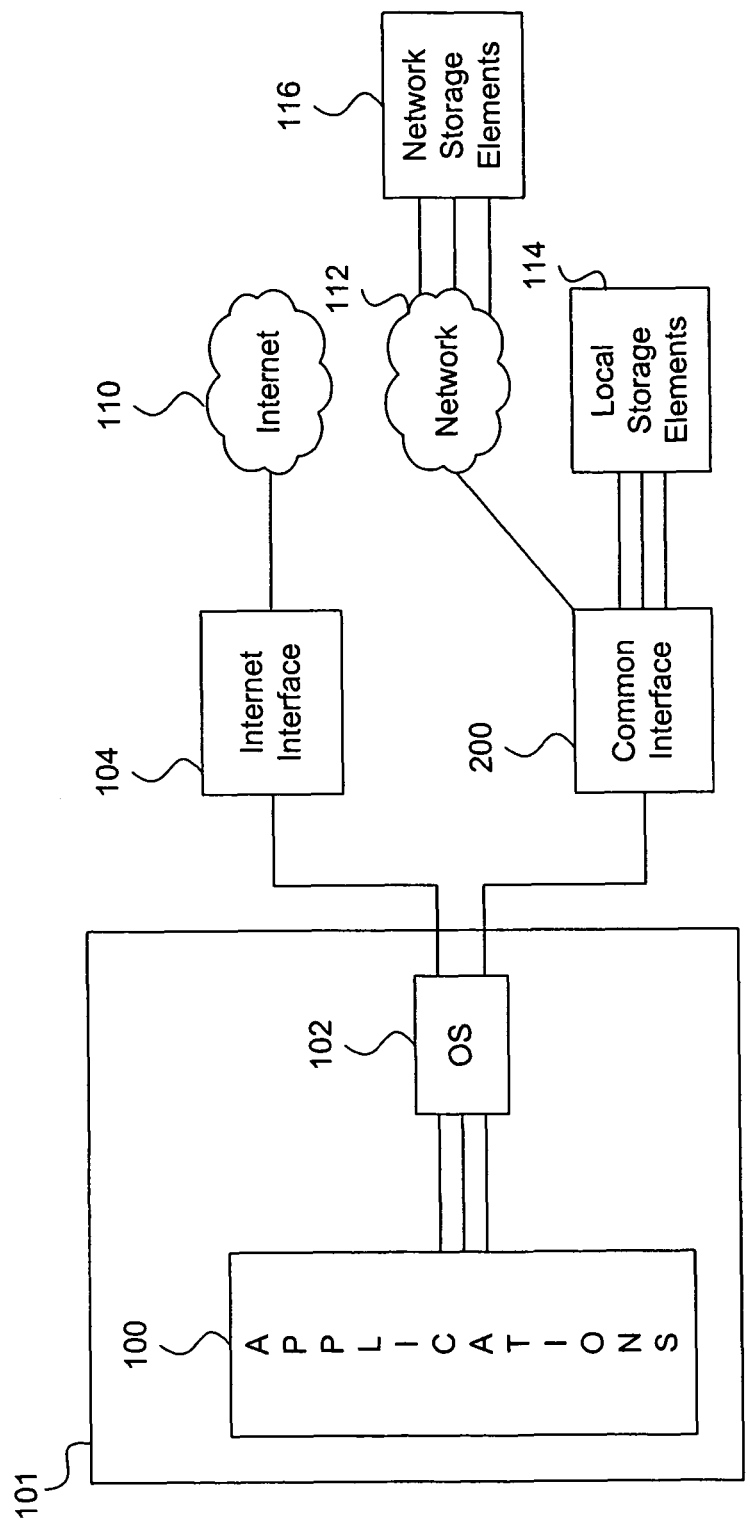
FIG. 2 illustrates an example embodiment.

FIG. 2 is an exemplary embodiment of the invention illustrating a storage system with a combined local and network data storage interface, illustrated by a data storage interface 200. Computer 101 runs software applications 100 under operating system 102. The storage system associated with computer 101 includes internet interface 104, network 112, network storage elements 116, local storage elements 114 and the internet 110. The combined interface 200 comprises controller software or firmware for controlling hardware interfaces coupled to network storage elements 116 and/or local storage elements 114. In other embodiments, combined interface 200 is a hardware element with associated controller software that can provide the required connectivity to access local or network storage elements 114, 116.

Common interface 200 presents a single storage stack to OS 102. To end users, and particularly to applications 100 and OS 102, both local storage elements 114 and network storage elements 116 will thus appear as a single storage unit.

Figure 3:
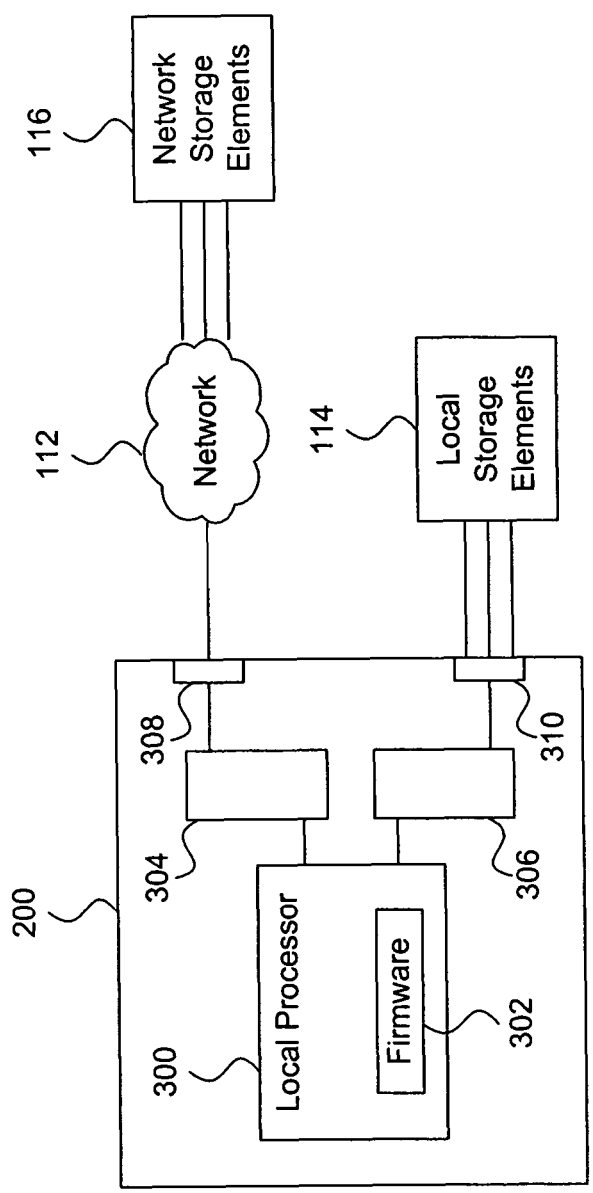
FIG. 3 illustrates an embodiment of a common interface.

FIG. 3 illustrates a further embodiment, showing in more detail a design for common interface 200. In this embodiment, common interface 200 is a single card combination of a network controller card and local storage controller card with a dedicated local processor 300. Connectivity to network storage elements 116 is provided via connector 308 through network 112, and connectivity to local storage elements 114 is provided via connector 310. Processor 300 located on the combined interface card 200 controls storage operations and reduces the computational load on the system processor. Firmware 302 running on local processor 300 controls circuitry 304 and 306 on combined interface 200 to enable data access for applications 100 from both local and network storage elements 114, 116 via local storage connector 310 and network storage connector 308 respectively. Preferably, common interface 200 presents a single storage stack to OS 102, via firmware 302, which can transmit requests for storage and file management operations to common interface 200. OS 102 pushes data onto the stack during storage operations and pulls data from the stack during retrieval. To end users, and particularly to applications 100 and OS 102, both local storage elements 114 and network storage elements 116 will thus appear as a single storage unit.

Figure 4:
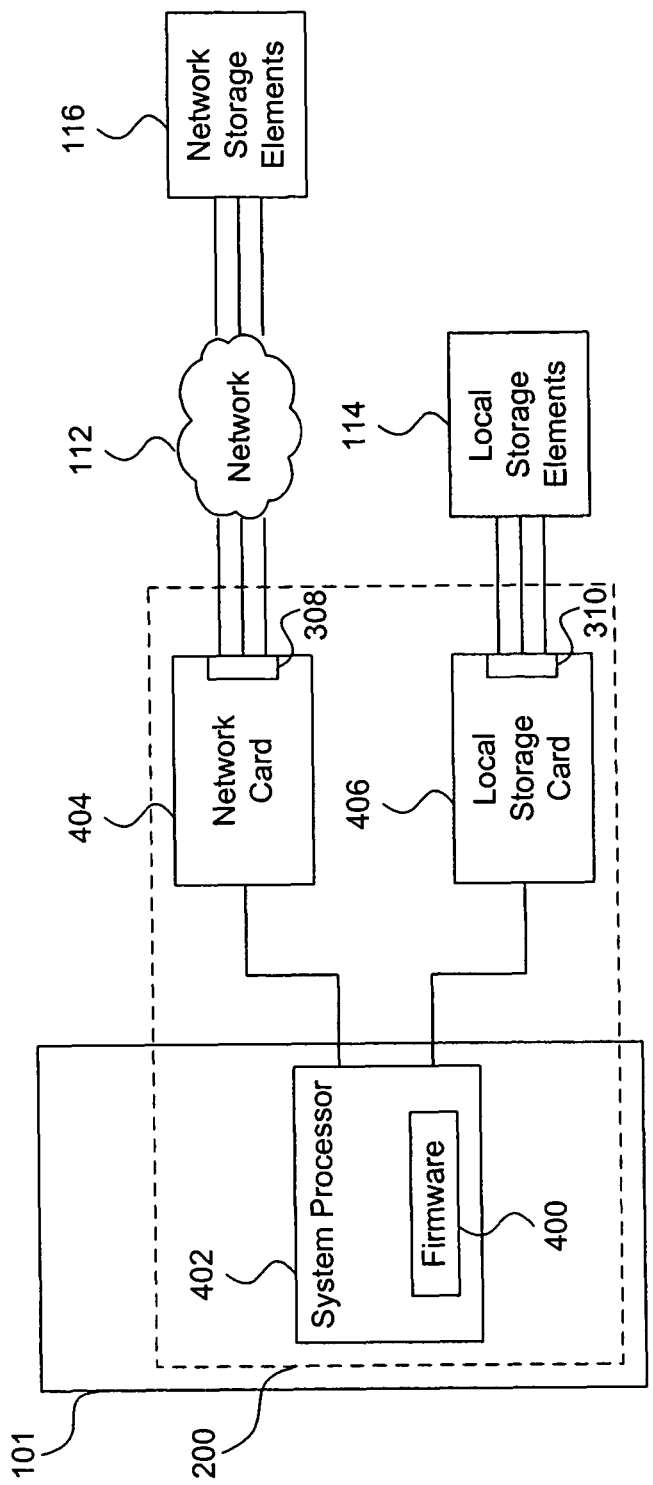
FIG. 4 illustrates another embodiment of a common interface.

FIG. 4 is a detailed view of another embodiment of combined interface 200. In this embodiment, the combined interface 200 is a combination of common firmware 400 running on system processor 402, distinct network card 404 and distinct local storage device controller card 406. The local storage device controller card 406 connects to local storage elements 114 via connector 310 and the network card 304 connects to network storage elements 116 via connector 308 and network 112. The common firmware 300 runs on system processor 402 and provides control signals to network card 404 or the local storage device controller card 406. In other embodiments, firmware 300 may run on a local processor mounted on either network card 404 or local storage device controller card 406. In FIG. 4 network card 404 and local storage device controller card 406 are shown to be outside computer system 101. In other embodiments network card 404 and local storage card 406 may be mounted inside computer system 101 on a system motherboard (not shown). In the embodiment presented in FIG. 4, conventional network and local storage interface cards 404 and 406 may be used since the common interface firmware 400 makes the separate cards appear as a virtual single storage interface 200. The local storage device controller card 406 may be a RAID controller card and the local storage elements 114 may be disk drives that are part of a RAID array. By using the common interface 200 having common firmware 400, network storage elements 116 can be made a part of the local RAID array and managed by the common firmware 400. To the user, applications 100 and OS 102, both local storage elements 114 and network storage elements 116 will appear as a single storage unit that is part of a commonly managed RAID array. Common interface 200 can present a single storage stack to OS 102.

Figure 5:
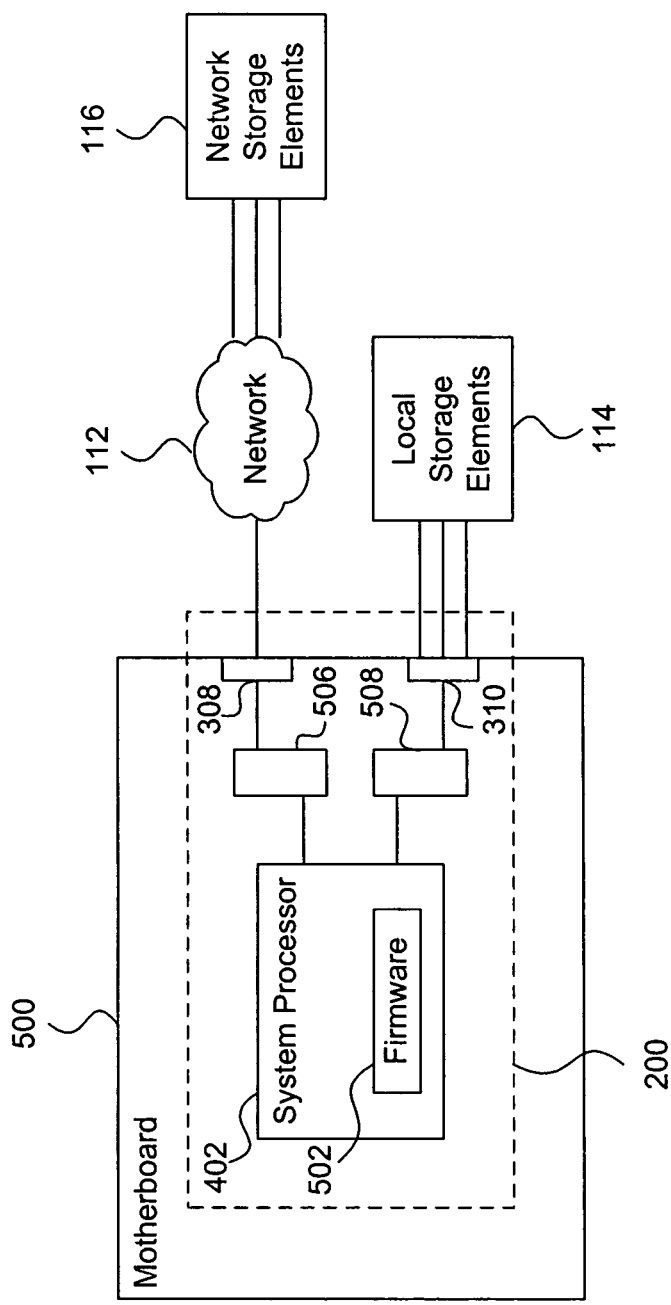
FIG. 5 illustrates another embodiment of a common interface.

FIG. 5 illustrates a further embodiment, in which local storage connector 310, network storage connector 308, and control circuits 506 and 508 associated with the network 308 and local 310 storage connectors are integrated on the system motherboard 500 along with system processor 402. Firmware 502 running on the system processor 402 provides the same interface functionality described previously, that is, firmware 502 provides a common storage interface to the operating system 102 running in system processor 402. Integration of the hardware and firmware functions of common interface 200 into the motherboard, as illustrated in FIG. 5, increases integration of components, thus reducing the size and cost of computer systems. These embodiments obviate the need to provide separate network interface 404 and local interface 406 cards, thereby freeing up valuable real estate while reducing costs at the same time. Hardware components of network and local interface cards 404 and 406 may be partially implemented in firmware 502 running on system processor 402 and partially on motherboard 500 as control circuitry 506 and 508.

Figure 6:
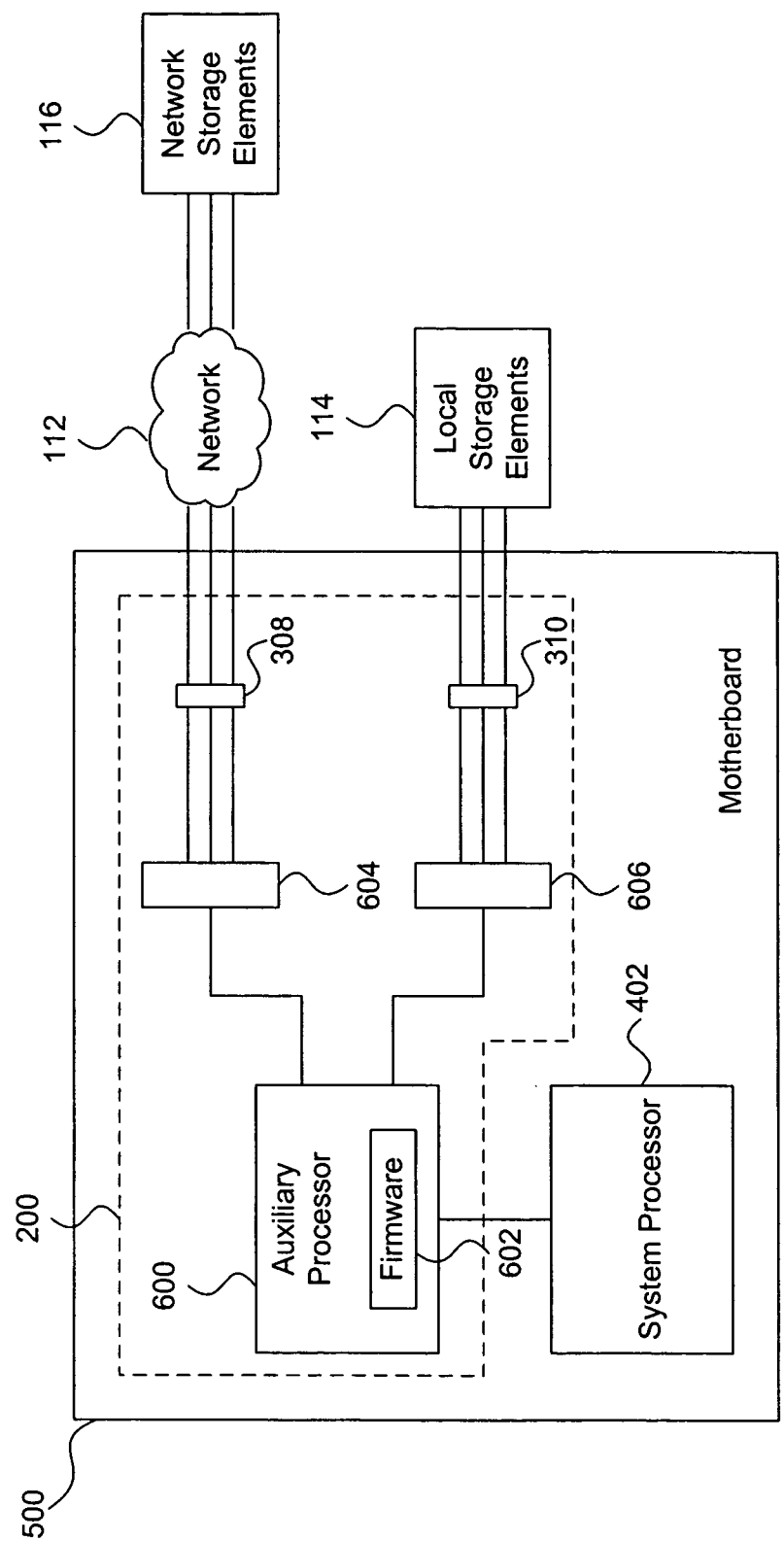
FIG. 6 illustrates another embodiment of a common interface.

FIG. 6 illustrates a modification of the design of FIG. 5., where common interface 200 is implemented on the motherboard 500 using a dedicated auxiliary processor 600 for managing interface tasks, rather than using resources of the system processor 402 (as shown in FIG. 4 and FIG. 5). Common interface 200 in addition to a local storage connector 310, network storage connector 308 and associated control circuitry 604 and 606 mounted on the motherboard 500 has a dedicated auxiliary processor 600 installed on motherboard 500 to run firmware 602 for accessing local storage elements 114 and network storage elements 116. This removes the storage processing load from system processor 402 and frees its resources for other computational purposes. Preferably auxiliary processor 600 is connected for direct memory access (DMA) and operates substantially independently of, but in concert with, system processor 402. System processor 302 informs the auxiliary processor 600 of a storage request from an application 100. The auxiliary processor 600 then accesses data accordingly on either local storage 114 and/or network storage 116 depending on the storage configuration. As an alternate to the embodiment presented in FIG. 6, connectors 308, 310 and their associated control circuitry 604 and 606 can be can be substituted by network card 404 and local storage interface card 406 respectively.

Figure 7:
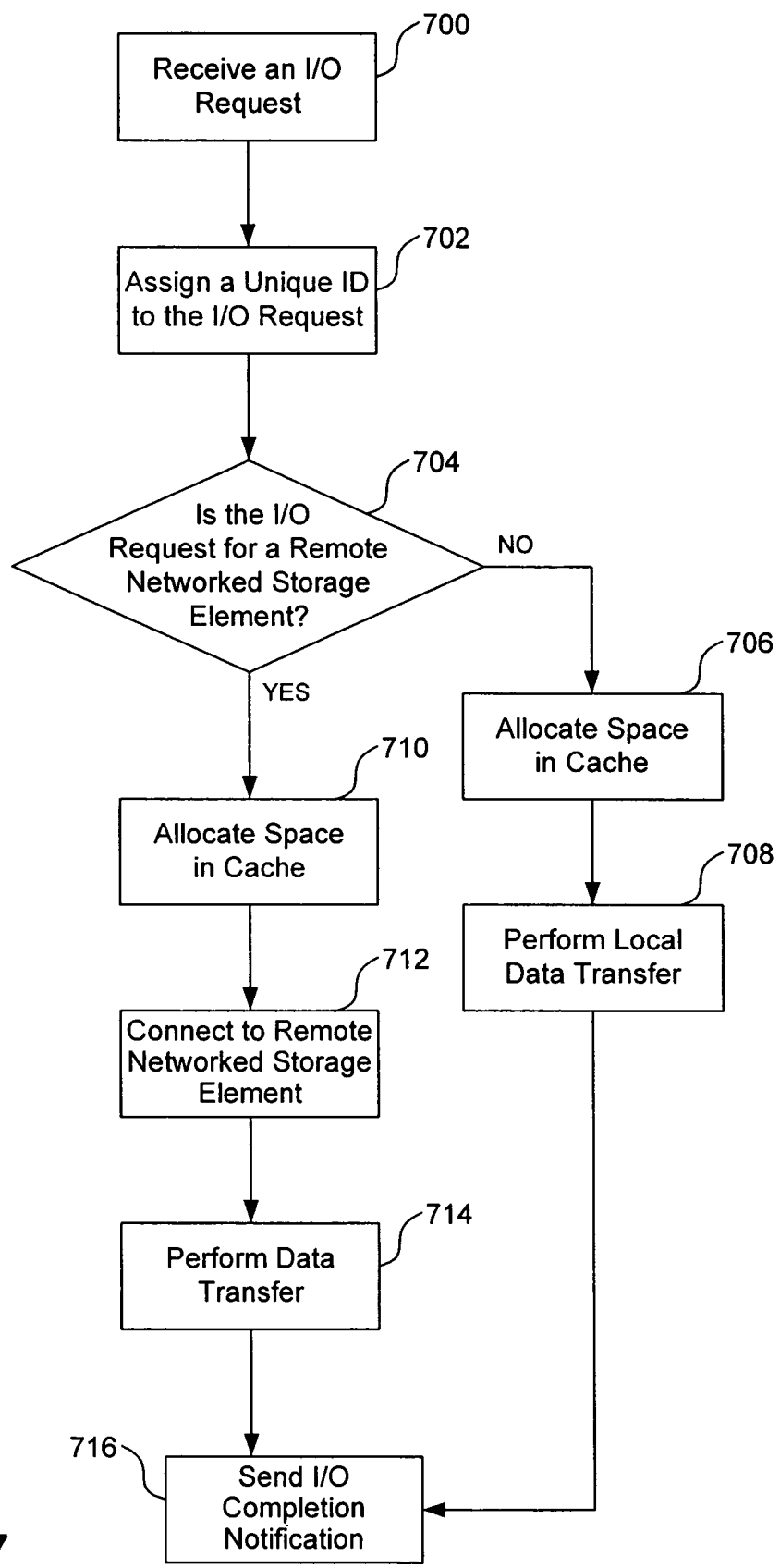
FIG. 7 is an exemplary flowchart according to an embodiment of the invention.

FIG. 7 is an exemplary flowchart that outlines the general steps taken by the software or firmware to present a unified storage interface to the OS 102 and application 100. The flowchart provides a broad outline of the steps that may be performed by firmware including but not limited to firmware embodiments 302, 400, 502 and 602. Each embodiment of the firmware may have to modify the steps according to the implementation of common interface 200.

In step 700, the firmware receives an I/O request via OS 102 from a host which may be application 100. In other embodiments the I/O request may originate from another hardware or software element internal or external to computer system 101.

In step 702, a unique identifier is assigned to the I/O request. This unique identifier specifies whether the I/O request is for data transfer to or from a local or remote networked storage element 114,116. The unique ID may include information such as whether it is a read or write operation, the block number to read from or write to and size of the data to be transferred. For remote networked I/O requests, the unique identifier may also specify the location of the one or more remote networked storage elements 116, protocol and password that may be required to access these. After assigning a unique identifier, the I/O request is added to the common storage stack for local and remote networked I/O requests.

In step 704, an I/O request is removed from the common storage stack and the unique identifier assigned to it is used to determine if its is a local or remote networked I/O request.

In step 706, the 1/O request identified as a local I/O request is allocated space in a memory or cache to enable data transfer between applications 100 and remote networked storage elements 116. The amount of space to be allocated in the cache may be determined by obtaining data transfer size from the unique identifier.

In step 708, data is transferred to or from a local storage element 114 over a PCI, SCSI or other local storage element bus. In some embodiments, the data transfer to or from local storage elements may be performed by a DMA controller. The firmware may initiate the data transfer by giving the location and data size to a DMA controller and having the DMA controller complete the data transfer to or from the allocated memory space in step 706 and the local storage element.

In step 710, the I/O request identified as a remote networked I/O request is allocated space in memory or a cache to enable data transfer between applications 100 and remote networked storage elements 116. The amount of space to be allocated in the cache may be determined by obtaining data transfer size from the unique identifier.

In step 712, after allocating space in the cache for the remote networked I/O request, a connection is made between computer system 101 and one or more remote networked storage elements 116 via network 112 to enable data transfer between applications 100 and remote networked storage elements 116. The data transfer between applications 100 and remote networked storage elements 116 is usually via temporary local buffer memory in computer system 101. The data transfer may occur via a cache buffer or any other form of memory in computer system 101 and remote networked storage elements 116 as directed by the firmware. The network connection reserves a bus, such as a Fibre Channel bus, for data transfer. In some embodiments, the network connection and authentication process is executed by obtaining information from the unique identifier associated with the I/O request.

In step 714, after a network connection to one or more remote networked storage elements 116 has been established, data is transferred to or from remote networked storage element(s) 116. In an exemplary embodiment an ordered DMA or RDMA transfer between computer system 101 and one or more remote networked storage elements 116 is utilized to reduce processor load. The firmware may initiate the data transfer by giving the location and size of the data to a DMA or RDMA controller and have the controller complete the data transfer between the allocated memory space in step 710 and the remote networked storage element 116. In an ordered data transfer, the blocks to be transferred are in order. Generally remote data transfer requires blocks to be in order.

In step 716, after either the local or remote networked I/O request has been completed, notification is sent to the OS 102 and/or the application 100 to indicate that the I/O request has been completed.

In some embodiments, steps 706 and 710 which allocate memory space may be skipped by allocating space on the fly during data transfer. Generally space in a cache is allocated if data is to be transferred via DMA or RDMA. The cache may be bypassed for some non-DMA data transfers and even for some DMA data transfers.

An I/O request may require the data to be written to or read from multiple local and/or remote networked storage elements 114, 116. An example of this is a RAID array that includes local and remote network storage elements 114, 116. Using unique identifiers and other information such as location, protocol and passwords to be used for remote transfer, such I/O requests can also be executed.

The firmware used may be divided into three parts, a top, middle and bottom driver, each of which may be run together or separately in different locations to perform the steps shown in FIG. 7. For example, the top driver may run on the system CPU, the middle driver on a local processor on a RAID controller card and the bottom driver on a disk drive controller. In some embodiments, all three drivers may run on a local RAID controller processor. The top driver may be used to receive an I/O request from OS 102 and assign a unique identifier to the I/O request. The middle driver may be used to perform the necessary computations to process the I/O request such as XOR, AND etc. The bottom driver may be used to generate the signals to communicate with the local and/or remote network storage elements 114, 116.

The common stack used to store local and remote networked I/O requests may use a Last In First Out (LIFO) or First In First Out (FIFO) algorithm to sort I/O requests. The common stack may also use other algorithms to sort I/O requests to optimize efficiency or to meet user and system requirements.

Network 112 includes but is not limited to any combination of network architectures, including the integrated services digital network (ISDN), the internet, a local area network (LAN), a wide area network (WAN), a metropolitan area network (MAN), a wireless communications network, asynchronous transfer mode (ATM) network, personal area network (PAN), or a wireless LAN (WLAN). The network topology for network 112 includes but is not limited to any combination of a bus network, star network, ring network, mesh network or star-bus network.

Application 100 includes but is not limited to any combination of platform software, applications and/or user-written software. Platform software has the basic input-output system (often described as firmware rather than software), device drivers, an operating system, and typically a graphical user interface which, in total, allow a user to interact with the computer and its peripherals (associated equipment). Examples of application 100 include office suites and video games.

The local and network storage elements 114, 116 can include but are not limited to bubble memory, cache memory, core memory (also known as ferrite core memory), core rope memory, delay line memory, holographic memory, magnetic disk memory (such as floppy disk, hard disk, magnetic drum, magnetic tape, magneto-optical disk, memory stick, optical media (PD, CD-R, CD-ROM, CD-RW, DVD, DVD-RAM, DVD-RW, Blu-ray), paper tape, selectron tube, semiconductor memory (such as EPROM, flash memory, NVRAM, RAM, ROM, VRAM, WRAM, thin film memory) and other forms of memory that may be volatile, non-volatile, mutable or immutable.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The invention has been described for local and remote networked storage systems. The invention is not, however, limited to these example embodiments. Based on the description herein, one skilled in the relevant art(s) will understand that the invention can be applied to combine only local and/or only remote applications and create a common interface that is invisible to the OS, application and/or user.

Figure 8:
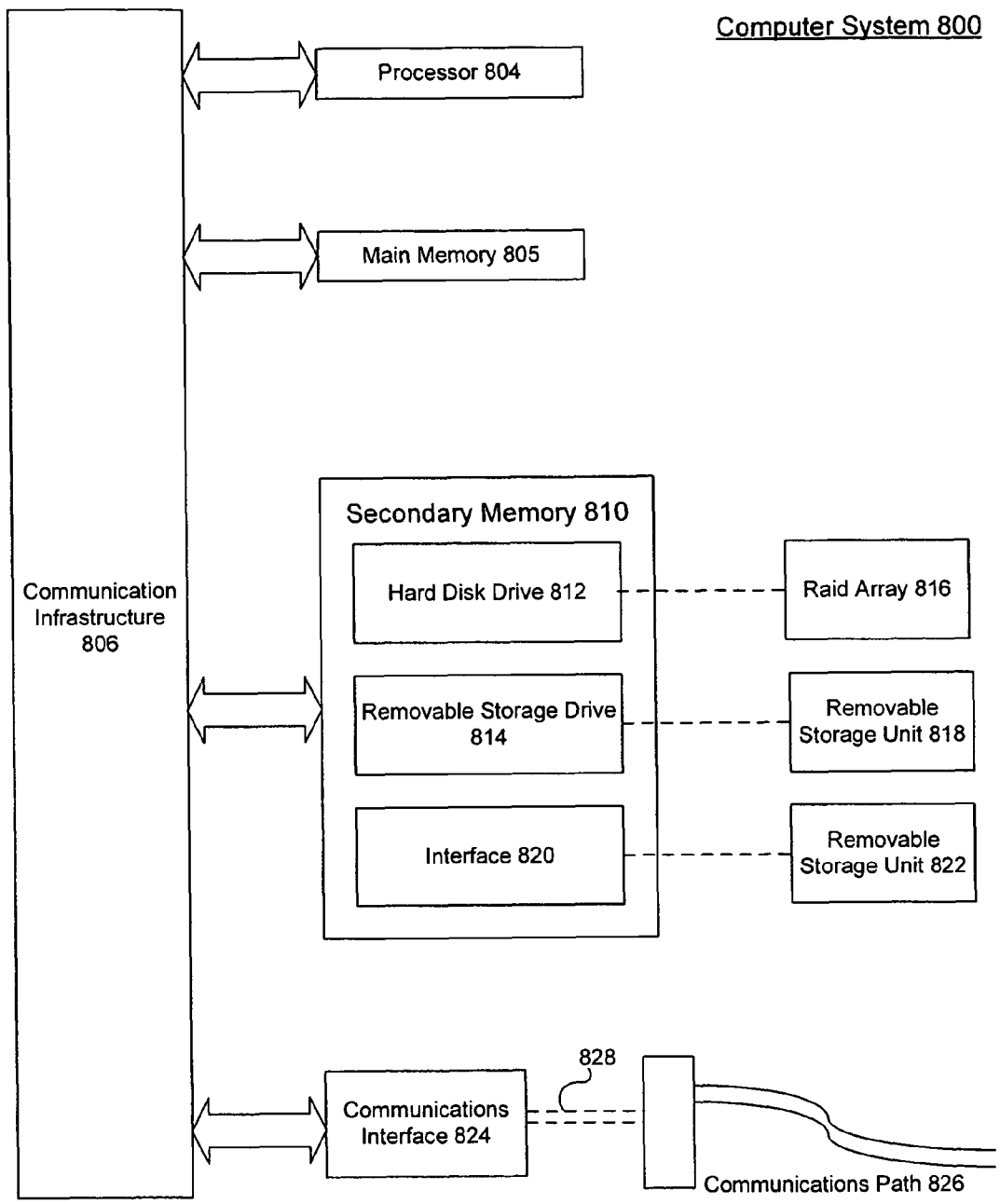
FIG. 8 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the invention using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 804 to implement the processes of the present invention. Where the invention is implemented using software, the software may be stored in a computer program product and loaded into computer system 800 using raid array 816, removable storage drive 814, hard drive 812 or communications interface 824.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A data transfer method, comprising:
receiving an Input/output (I/O) request at a data storage interface accessible by an operating system in a computer system;
assigning a unique identifier to said I/O request;
storing said I/O request in a common stack on a RAID controller card, wherein the common stack includes both local and remote networked I/O requests;
determining whether said I/O request is a local or a remote networked I/O request based on said unique identifier;
transferring data between an application and at least one of a local storage element and a remote networked storage element, as a function of said unique identifier, using the same data storage interface;
wherein the common stack on the RAID controller provides a single data storage interface that virtually combines the local storage element and the remote networked storage element; and
wherein the single data storage interface renders the local storage element and the remote networked storage element invisible to the operating system and an end user.

2. The method of claim 1, further comprising ordering remote networked I/O requests.

3. The method of claim 1, further comprising allocating space in memory to enable said data transfer between said application and at least one of said local storage element and said remote networked storage element.

4. The method of claim 1, wherein an ordered data transfer to or from at least one remote networked storage element is initiated by said data storage interface and completed using Direct Memory Access (DMA).

5. The method of claim 1, wherein data transfer to or from at least one local storage element is initiated by said data storage interface and completed using Direct Memory Access (DMA).

6. The method of claim 1, further comprising connecting said computer system to at least one remote networked storage element over a network to execute a remote networked I/O request.

7. The method of claim 1, wherein said unique identifier comprises information to enable connection between said computer system and at least one remote networked storage element if said I/O request is a remote networked I/O request.

8. The method of claim 1, wherein said unique identifier comprises location and size of data to be transferred and whether said I/O request is a local or remote networked I/O request.

9. The method of claim 1, wherein said I/O request comprises a command packet for data transfer between an application and at least one local storage device and at least one remote networked storage device.

10. A computer program product comprising a non-transitory computer useable medium including control logic stored therein for transferring data comprising:
first control logic means for causing a computer to receive an Input/output (I/O) request at a data storage interface accessible by an operating system;
second control logic means for causing a computer to assign a unique identifier to said I/O request;
third control logic means for causing a computer to determine whether said I/O request is a local or a remote networked I/O request based on said unique identifier; and
fourth control logic means for causing a computer to transfer data between an application and at least one of a local storage element and a remote networked storage element, as a function of said unique identifier, using the same data storage interface;
wherein said I/O request is stored in a common stack that includes both local and remote networked I/O requests;
wherein the common stack is on a RAID controller card;
wherein the common stack on the RAID controller provides a single data storage interface that virtually combines the local storage element and the remote networked storage element; and
wherein the single data storage interface renders the local storage element and the remote networked storage element invisible to the operating system and an end user.

11. The computer program product of claim 10, wherein remote networked I/O requests are ordered.

12. The computer program product of claim 10, further comprising fifth control logic means to allocate space in memory to enable data transfer between said application and at least one of said local storage element and said remote networked storage element.

13. The computer program product of claim 10, wherein an ordered data transfer to or from at least one remote networked storage element is initiated by said data storage interface and completed using Direct Memory Access (DMA).

14. The computer program product of claim 10, wherein data transfer to or from at least one local storage element is initiated by said data storage interface and completed using Direct Memory Access (DMA).

15. The computer program product of claim 10, further comprising fifth control logic means to connect a computer to at least one remote networked storage element over a network to execute a remote networked I/O request.

16. The computer program product of claim 10, wherein said unique identifier comprises information to enable a connection between a computer and at least one remote networked storage element if said I/O request is a remote networked I/O request.

17. The computer program product of claim 10, wherein said unique identifier comprises location and size of data to be transferred and whether said I/O request is a local or remote networked I/O request.

18. The computer program product of claim 10, wherein said I/O request comprises a command packet for data transfer between an application and at least one local storage device and at least one remote networked storage device.

19. The computer program product of claim 10, wherein a top driver running on a system processor includes the first and second control logic means, a middle driver running on a processor of the RAID controller includes the third control logic means and a bottom driver running on a disk-drive controller includes the fourth control logic means.

20. The method of claim 1, wherein the common stack allows for network booting and RAID mirroring to network servers that is invisible to the operating system.

* * * * *